United States Patent [19]

Jackson, Jr. et al.

[11] Patent Number: 4,673,726

[45] Date of Patent: Jun. 16, 1987

[54] POLY(ESTER-IMIDES) AND POLY(ESTER-IMIDE-AMIDES) OF TRIMELLITIC ANHYDRIDE AND 4-(AMINOMETHYL)CYCLOHEXANEMETHANOL

[75] Inventors: Winston J. Jackson, Jr.; John C. Morris, both of Kingsport, Tenn.

[73] Assignee: Eastman Kodak Company, Rochester, N.Y.

[21] Appl. No.: 818,301

[22] Filed: Jan. 13, 1986

[51] Int. Cl.[4] ............................................. C08G 63/18
[52] U.S. Cl. .................................... 528/288; 528/296; 528/298; 528/302; 528/305; 528/342; 528/344; 528/350
[58] Field of Search ............... 528/288, 296, 298, 302, 528/305

[56] References Cited

U.S. PATENT DOCUMENTS 4,116,941 9/1978 Hanson .............................. 528/288

Primary Examiner—Harold D. Anderson
Attorney, Agent, or Firm—William P. Heath, Jr.; J. Frederick Thomsen

[57] ABSTRACT

Polymer compositions containing repeating units from 0 to 95 mol percent of aromatic dicarboxylic acids containing 8 to 16 carbon atoms and having at least three carbon atoms between carboxyl groups or esters thereof, repeating units from 0 to 95 mol % 1,4-cyclohexanedimethanol, repeating units from 5 to 100 mol % trimellitic acid or anhydride, and repeating units from 5 to 100 mol % 4-(aminomethyl)cyclohexanemethanol, and wherein the mol % of the repeating units from the trimellitic acid or anhydride does not exceed the mol % of repeating units from the 4-(aminomethyl)-cyclohexanemethanol.

4 Claims, No Drawings

POLY(ESTER-IMIDES) AND POLY(ESTER-IMIDE-AMIDES) OF TRIMELLITIC ANHYDRIDE AND 4-(AMINOMETHYL)CYCLOHEXANEMETHANOL

DESCRIPTION

1. Technical Field

This invention relates to poly(ester-imides) and poly(ester-imide-amide) polymer compositions useful as molding plastics and for the production of films and fibers. The molding plastics are characterized by exceptionally high toughness and the molding plastics, as well as films and fibers, are characterized by high glass transition temperatures and thus high heat resistance.

The polymer compositions of this invention contain repeating units from 0 to 95 mol percent of aromatic dicarboxylic acids containing 8 to 16 carbon atoms and having at least three carbon atoms between carboxyl groups or esters thereof, repeating units from 0 to 95 mol % 1,4-cyclohexanedimethanol, repeating units from 5 to 100 mol % trimellitic acid or anhydride, and repeating units from 5 to 100 mol % 4-(aminomethyl)-cyclohexanemethanol, and wherein the mol % of the repeating units from the trimellitic acid or anhydride does not exceed the mol % of repeating units from the 4-(aminomethyl)cyclohexanemethanol.

2. Background Art

U.S. Pat. No. 3,060,191 and U.S. Pat. No. 3,880,812 disclose poly(alkylene trimellitimides) which are based on trimellitic anhydride (TMA) and aminoalcohols containing 2 to 12 carbon atoms. U.S. Pat. No. 3,944,706 discloses use of poly(ethylene trimellitate imide) as a wire top coat varnish. Essentially all examples are based on the ester imide formed by reaction of TMA with ethanolamine (EA). U.S. Pat. Nos. 3,458,480; 3,459,829; 3,562,219; 3,697,471; 3,929,714; 4,145,334; 4,267,232 and 4,145,351 disclose poly(ester-imides) based on TMA and aliphatic aminoalcohols. All examples are based on TMA and ethanolamine and, in addition, the examples in these patents all contain multifunctional compounds which are required to thermoset the polymers. U.S. Pat. No. 3,793,250 discloses poly(ester-imides) based on TMA and aliphatic aminoalcohols but these polymers also contain the lactam ring. Poly(ester-imides) and an improved process for making the polymers are also disclosed in U.S. Pat. No. 4,245,086. Poly(alkylene trimellitimide) poly(ester-imides) are also disclosed in U.S. Pat. No. 4,012,555 where the polymers are blended with poly(alkylene diimides). Again, all examples are based primarily on the poly(ester-imide) formed by reaction of trimellitic anhydride with ethanolamine.

U.S. Pat. No. 3,880,812, discloses poly(ester-imides) of high molecular weight and processes for preparing the polymers. According to column 3, lines 19-22, "n-hydroxyethyl trimellitic acid imide is the preferred imide" and "preferably comprises at least 90 mol % of the mer units of the polymer." Also, in column 3, line 29 ff, it is disclosed that copolymers "with 10 to 20% of a higher hydroxyalkyl trimellitic acid imide have 20° to 40° C. lower heat deflection temperature than the preferred homopolymer."

DISCLOSURE OF THE INVENTION

This invention includes polymer compositions comprising repeating units from trimellitic acid or anhydride and repeating units from 4-(aminoethyl)cyclohexanemethanol (AMCHM). From 2 to 95 mol % of the repeating units from trimellitic acid or anhydride may be replaced with repeating units from aromatic dicarboxylic acids or esters thereof containing 8 to 16 carbon atoms and having at least 3 carbon atoms between carboxyl groups. Also, 2 to 95 mol % of the repeating units from 4-(aminomethyl)cyclohexanemethanol may be replaced with repeating units from 1,4-cyclohexanedimethanol (CHDM), provided the mol % of the repeating units from trimellitic acid or anhydride does not exceed the mol % of repeating units from the 4-(aminomethyl)cyclohexanemethanol.

It is preferred that the repeating units from the aromatic dicarboxylic acids be selected from terephthalic acid (TPA), 2-methylterephthalic acid, 2-chloroterephthalic acid, 2,5-dimethylterephthalic acid, 2,5-dichloroterephthalic acid or esters thereof. Up to 20 mol % of the repeating units from the terephthalic acids or esters thereof may be replaced with repeating units from other aromatic dicarboxylic acids or esters thereof having 8-16 carbon atoms and having at least 3 carbon atoms between carboxyl groups or aliphatic dicarboxylic acids or esters thereof containing 3 to 20 carbon atoms. Up to 30 mol % of the repeating units from the 1,4-cyclohexanedimethanol may be replaced with repeating units from other aliphatic glycols containing 2 to 10 carbon atoms. Also up to 20 mol % of the repeating units from the 4-(aminomethyl)cyclohexanemethanol may be replaced with repeating units from other aminoalcohols containing 2 to 12 carbon atoms.

It is preferred that at least 70 mol % of the repeating units from 4-(aminomethyl)cyclohexanemethanol are from trans-4-(aminomethyl)cyclohexanemethanol.

Our poly(ester-imides) based on trimellitic anhydride and (4-aminomethyl)cyclohexanemethanol have glass transition temperatures and heat deflection temperatures equal to or higher than those poly(ester-imides) based on TMA and EA. In addition, polymers based on (TMA)(AMCHM) imide have unexpectedly higher notched Izod impact strengths than the prior art polymers, i.e., poly(ester-imides) based on TMA and EA or TMA and 2,2-dimethyl-3-aminopropanol (DAP), at comparable imide content (Table 1). It should also be noted that the highest notched Izod impact strengths of the poly(ester-imides) based on EA and DAP which we report in Table 1 were obtained using the preformed imides of these aminoalcohols. Attempts to form the imides of these monomers in situ resulted in low molecular weight or brittle molding plastics having very poor color. Surprisingly, the imides based on AMCHM gave higher notched Izod impact strengths and very little color compared to the prior art imides even though the data reported in Table 1 for these (TMA)(AMCHM) poly(ester-imides) is based on in situ formation of the imide during the polymerization. No poly(ester-imide-amides) based on AMCHM are disclosed in the prior art and no examples of these polymers could be found. Table 2 shows our poly(ester-imide-amides) based on AMCHM have notched Izod impact strengths equal to or better than the poly(ester-imides) based on AMCHM.

The poly(ester-imides) of this invention are prepared from TPA or its esters, CHDM, TMA, and AMCHM, or from the preformed (TMA)(AMCHM) imide. The polymers are prepared using a variety of procedures well known in the art. These polymer processes include reacting in situ the TPA (acid or ester), CHDM, TMA, and AMCHM; reacting the preformed polyester with TMA and AMCHM; reacting the preformed polyester with the preformed (TMA)(AMCHM) imide; and reacting the TPA (acid or ester); CHDM, and the preformed (TMA)(AMCHM) imide. The processes which use the preformed imide (which may be used in the acid-hydroxy form or the ester-hydroxy form) and/or terephthalic acid are the preferred processes for making the polymers. In addition, solid-phase polymerization may also be used to prepare the crystalline polymers of this invention.

The terephthalic acid portion of the modified polymer may vary from about 2 to 95 mol % such that the sum of the trimellitic portion and the dicarboxylic acid portion of the polymer equal 100 mol %. The terephthalic acid portion may be replaced with a substituted terephthalic acid such as 2-methyl-, 2-chloro-, 2,5-dimethyl-, or 2,5-dichloroterephthalic acid. The terephthalic acid portion also may be replaced with up to 20 mol % of other aromatic dicarboxylic acids, such as 2,6-naphthalenedicarboxylic acid, 4,4'-biphenyldicarboxylic acid, or isophthalic acid, or with aliphatic dicarboxylic acids containing 5-20 carbon atoms, such as glutaric, adipic, pimelic, suberic, azelaic, sebacic, or dodecanedicarboxylic acids. Terephthalic acid is preferred.

The trimellitic portion of the modified polymer is always less than or equal to the AMCHM content of the polymer and may vary from about 5 to 98 mol % such that the sum of the trimellitic portion and the dicarboxylic acid portion of the polymer is equal to 100 mol %. The trimellitic portion of the polymer may be obtained from either trimellitic anhydride or trimellitic acid. Trimellitic anhydride is preferred.

The 1,4-cyclohexanedimethanol portion of the modified polymers may vary from 5 to 98 mol % such that the sum of the glycol portion and the aminoalcohol portion equals 100 mol %. The 1,4-cyclohexanedimethanol may consist of the cis isomer or the trans isomer or any mixture thereof. The 70% trans/30% cis CHDM isomer mixture is preferred. The CHDM may also be replaced with up to 30 mol % of an aliphatic glycol containing 2-10 carbon atoms such as ethylene glycol, 1,3-propanediol, neopentyl glycol, 1,4-butanediol, 1,5-pentanediol or 1,6-hexanediol.

The AMCHM portion of the modified polymer may vary from 2 to 95 mol % such that the sum of the glycol portion and the aminoalcohol portion of the polymer is equal to 100 mol % and such that the AMCHM content is always greater than or equal to the TMA content of the polymers. The AMCHM content may exceed the TMA content by up to 95 mol %. Also, the AMCHM may consist of the cis isomer or the trans isomer or any mixture thereof. The preferred isomer mixture contains at least 70 mol % trans isomer. Additionally, up to 20 mol % of the AMCHM portion of the polymer may be replaced with other aminoalcohols such as 2-aminoethanol, 2,2-dimethyl, 1,3-aminopropanol, 4-aminobutanol or 6-aminohexanol.

These poly(ester-imides) and poly(ester-imide-amides) are prepared in the melt or by solid-phase polymerization or by a combination of these processes. The polymers have an inherent viscosity of at least 0.4, but preferably 0.6 or more.

This invention can be further illustrated by the following examples of preferred embodiments thereof, although it will be understood that these examples are included merely for purposes of illustration and are not intended to limit the scope of the invention unless otherwise specifically indicated.

EXAMPLES

All inherent viscosities are determined in 60/40 (wt/wt) phenol/tetrachloroethane (PTCE) at a concentration of 0.5 g/100 mL. Polymer glass transition temperatures are determined using a Perkin-Elmer DSC-2 Differential Scanning Calorimeter.

The polymers are ground to pass a 3-mm screen prior to solid-phase polymerization. The polymers are dried at 100° C. in a vacuum oven overnight and injection-molded on a 1-oz Watson-Stillman molding machine to give 5-in. × ½-in. × ⅛-in. flexure bars. Notched Izod impact strength at 230° C. is determined using ASTM D256 procedures.

Examples 1-6 (Table 1) illustrate the unobviously high notched Izod impact strength of our poly(ester-imides) based on trimellitic anhydride and 4-(aminomethyl)cyclohexanemethanol compared to the prior art poly(ester-imides) based on trimellitic anhydride and ethanolamine or 2,2-dimethyl-3-aminopropanol. The remaining Examples 7-22 (Table 2) illustrate the various processes used to prepare these polymers and the exceptionally high notched Izod impact strengths of these poly(ester-imides) and poly(ester-imide-amides).

Unless otherwise specified, the 1,4-cyclohexanedimethanol isomer ratio is 70/30 trans/cis and the 4-(aminomethyl)cyclohexanemethanol is 85/15 trans/cis.

TABLE 1

Effect of Various Imides on the Notched Izod Impact Strength of Poly(1,4-Cyclohexylenedimethylene Terephthalate)

| Imide type | AMCHM[a] | | EA[b] | | DAP[c] | |
|---|---|---|---|---|---|---|
| Imide, mol % | 30[d] | 60[d] | 30[e] | 60[e] | 30[e] | 60[e] |
| Molding temp, °C. | 290 | 295 | 290 | 295 | 280 | 280 |
| I.V. before molding | 0.67 | 0.73 | 0.66 | 0.73 | 0.78 | 0.70 |
| I.V. after molding | 0.64 | 0.63 | 0.64 | 0.61 | 0.72 | 0.64 |
| Notched Izod, ft-lb/in. | 2.0 | 0.9 | 0.9 | 0.5 | 1.0 | 0.4 |
| Example No. | 1 | 2 | 3 | 4 | 5 | 6 |

[a]AMCHM = 4-(aminomethyl)cyclohexanemethanol
[b]EA = 2-aminoethanol
[c]DAP = 2,2-dimethyl-3-aminopropanol
[d]The imide was formed in situ during the polymerization
[e]These imides were preformed to prepare these polymers

TABLE 2

Notched Izod Impact Strength of Poly(1,4-Cyclohexylene-dimethylene Terephthalate) Modified with (TMA) (AMCHM)[a] Imide

| CHDM,[a] mol % | Imide, mol % | Amide, mol % | Molding Temp., °C. | I.V. Before Molding | I.V. After Molding | Notched Izod ft-lb/in. | Example No. |
|---|---|---|---|---|---|---|---|
| 70[b] | 30 | 0 | 290 | 0.76 | 0.70 | 11.7 | 17 |
| 70[c] | 30 | 0 | 300 | 0.79 | 0.67 | 2.0 | 1 |
| 70[c] | 30 | 0 | 310 | 1.05 | 0.85 | 3.8 | 7 |
| 70[d] | 30 | 0 | 280 | 0.77 | 0.72 | 2.7 | 8 |
| 70[d] | 30 | 0 | 305 | 1.07 | 0.94 | 8.2 | 9 |
| 70[e] | 30 | 0 | 290 | 0.84 | 0.73 | 10.7 | 10 |
| 68.5[f] | 30 | 1.5 | 280 | 0.79 | 0.70 | 4.4 | 11 |

TABLE 2-continued

Notched Izod Impact Strength of Poly(1,4-Cyclohexylene-
dimethylene Terephthalate) Modified with (TMA) (AMCHM)[a] Imide

| CHDM.[a] mol % | Imide. mol % | Amide. mol % | Molding Temp., °C. | I.V. Before Molding | I.V. After Molding | Notched Izod ft-lb/in. | Example No. |
|---|---|---|---|---|---|---|---|
| 68.5[f] | 30 | 1.5 | 305 | 1.02 | 0.89 | 20.2 | 12 |
| 70[d] | 20 | 10 | 295 | 0.83 | 0.76 | 22.0 | 13 |
| 60[d] | 20 | 20 | 295 | 0.84 | 0.78 | 15.0 | 14 |
| 40[d] | 10 | 50 | 295 | 0.83 | 0.79 | 2.3 | 15 |
| 30[d] | 20 | 50 | 295 | 0.79 | 0.75 | 2.2 | 16 |
| 0[d] | 98 | 2 | 305 | 0.87 | 0.85 | 1.0 | 18 |
| 0[g] | 100 | 0 | 305 | 0.81 | 0 | 0.7 | 22 |

[a]CHDM = 70/30 trans/cis 1,4-cyclohexanedimethanol, TMA = trimellitic anhydride, AMCHM = 4-(aminomethyl)cyclohexanemethanol
[b]Prepared using the preformed (TMA) (AMCHM) imide
[c]Prepared using dimethyl terephthalate, trimellitic anhydride, and AMCHM
[d]Prepared using terephthalic acid, trimellitic anhydride, and AMCHM
[e]Prepared by reaction of trimellitic anhydride and AMCHM with the preformed polyester
[f]Prepared using terephthalic acid, trimellitic acid, and AMCHM
[g]Prepared using trimellitic acid

EXAMPLE 1

The following example illustrates the preparation of the poly(ester-imide) containing units from 70 mol % terephthalic acid, 70 mol % 1,4-cyclohexanedimethanol, 30 mol % trimellitic anhydride, and 30 mol % 4-(aminomethyl)cyclohexanemethanol.

A mixture of 122.2 g (0.63 mol) dimethyl terephthalate, 100.8 g (0.7 mol) 1,4-cyclohexanedimethanol, 51.8 g (0.27 mol) trimellitic anhydride, 38.6 g (0.27 mol) 4-(aminomethyl)cyclohexanemethanol, and 0.15 g titanium tetraisopropoxide (100 ppm Ti) is placed in a 1-liter flask equipped with a metal stirrer, an inlet for argon or nitrogen and a short distillation column. The contents of the flask are heated in a Woods' metal bath with stirring under argon at 230° C. for 1 hr. and at 275° C. for ½ hr. A vacuum of 0.5 mm is gradually applied over the next 10 minutes while the bath temperature is increased to 295°–300° C. Full vacuum is maintained for ¾ to 1 hr. The flask is released to argon to give a high melt viscosity, light yellow, clear polymer with an I.V. of 0.79 and a Tg of 120° C.

The polymer is injection-molded at 300° C. to give molded bars with a notched Izod impact strength of 2.0 ft-lb/in.

EXAMPLE 2

The polymer containing units from 40 mol % terephthalic acid, 40 mol % 1,4-cyclohexanedimethanol, 60 mol % trimellitic anhydride, and 60 mol % 4-(aminomethyl)cyclohexanemethanol is prepared according to the procedure of Example 1 to an I.V. of 0.73. The polymer has a Tg of 139° C.

The polymer is injection-molded at 295° C. to give molded bars with a notched Izod impact strength of 0.9 ft-lb/in.

EXAMPLE 3

The following example illustrates the preparation of the poly(ester-imide) containing units from 70 mol % terephthalic acid, 70 mol % 1,4-cyclohexanedimethanol, and 30 mol % of the preformed imide of trimellitic anhydride and ethanolamine.

A mixture of 67.9 g (0.350 mol) dimethyl terephthalate, 55.4 g (0.385 mol) 1,4-cyclohexanedimethanol and 35.3 g (0.15 mol) 2,3-dihydro-2-(2-hydroxyethyl)-1,3-dioxo-1H-isoindole-5-carboxylic acid 0.077 g titanium tetraisopropoxide (100 ppm Ti) were placed in a 500-mL flask equipped with a metal stirrer, an inlet for argon or nitrogen, and a short distillation column. The contents of the flask are heated in a Woods' metal bath with stirring under argon at 220° C. for 1 hr. and at 260° C. for ½ hr. A vacuum of 0.5 mm is gradually applied over the next five minutes as the temperature is raised to 290° C. Full vacuum is maintained for 1¼ hr. The amber, hazy, high melt viscosity polymer obtained has an I.V. of 0.66 and a Tg of 113° C.

The polymer is injection-molded at 290° C. to give molded bars with a notched Izod impact strength of 0.9 ft-lb/in.

EXAMPLE 4

The polymer containing units from 60 mol % of the preformed imide of trimellitic anhydride and ethanolamine (see Example 3), and 40 mol % terephthalic acid, and 40 mol % 1,4-cyclohexanedimethanol is prepared as in Example 3 to an I.V. of 0.73. The polymer has a Tg of 127° C.

The polymer is injection-molded at 295° C. to give molded bars with a notched Izod impact strength of 0.5 ft-lb/in.

EXAMPLE 5

This example illustrates the preparation of the poly(ester-imide) containing units from 70 mol % terephthalic acid, 70 mol % 1,4-cyclohexanedimethanol, and 30 mol % of the preformed imide of trimellitic anhydride and 2,2-dimethyl-3-aminopropanol.

A mixture of 67.9 g (0.350 mol) dimethyl terephthalate, 55.4 g (0.385 mol) 1,4-cyclohexanedimethanol, 38.9 g (0.15 mol) 2,3-dehydro-2-(3-hydroxy-2,2-dimethylpropyl)-1,3-dioxo-1H-isoindole-5-carboxylic acid, and 0.08 g titanium tetraisopropoxide are placed in a 500-mL flask equipped with a metal stirrer, an inlet for nitrogen or argon, and a short distillation column. The contents of the flask are heated in a Wood's metal bath with stirring under argon at 225° C. for 1 hr. at 275° C. for ⅔ hr., and at 300° C. for ¼ hr. A vacuum of 0.5 mm is gradually applied and maintained for 1¼ hr. A high melt viscosity, orange polymer is obtained with an I.V. of 0.78 and a Tg of 109° C.

The polymer is injection-molded at 280° C. to give molded bars with a notched Izod impact strength of 1.0 ft-lb/in.

EXAMPLE 6

The polymer containing units from 60 mol % of the preformed imide of trimellitic anhydride and 2,2-dimethyl-3-aminopropanol (see Example 5), 40 mol % terephthalic acid, and 40 mol % 1,4-cyclohexanedimethanol is prepared as in Example 5 to an I.V. of 0.70. The polymer has a Tg of 123° C.

The polymer is injection-molded at 280° C. to give molded bars with a notched Izod impact strength of 0.4 ft-lb/in.

EXAMPLE 7

A polymer having the same composition as Example 1 is prepared to an I.V. of 0.65. The polymer is ground, dried, and solid phase polymerized by heating at 110° C. for 1 hr., at 180° C. for 1 hr. and at 250° C. for 4 hrs. The polymer has an I.V. of 1.05 and a Tg of 121° C.

The polymer is injection-molded at 310° C. to give molded bars with a notched Izod impact strength of 3.8 ft-lb/in.

EXAMPLE 8

A polymer having the same composition as Example 1 is prepared, using terephthalic in place of dimethyl terephthalate, to an I.V. of 0.54. The polymer is ground, dried, and solid phase polymerized using the procedures similar to those in Example 7. The solid-phased polymer has an I.V. of 0.77.

The polymer is injection-molded at 280° C. to give molded bars with a notched Izod impact strength of 2.7 ft-lb/in.

EXAMPLE 9

Prepolymer from Example 8 is solid-phase polymerized as in Example 7 but the final solid-phase polymerization is carried out at 240° C. for 5½ hrs. to give polymer with an I.V. of 1.07.

The polymer is injection-molded at 305° C. to give molded bars with a notched Izod impact strength of 8.2 ft-lb/in.

EXAMPLE 10

This example illustrates the preparation of a polymer having the same composition as Example 1 by reaction of the preformed polyester with the trimellitic anhydride and 4-(aminomethyl)cyclohexanemethanol.

A mixture of 172.6 g (0.63 mol) poly(70/30 trans/cis 1,4-cyclohexylenedimethylene terephthalate), 51.8 g (0.27 mol) trimellitic anhydride, 38.6 g (0.27 mol) 4-(aminomethyl)cyclohexanemethanol, and 0.08 g titanium tetraisopropoxide (50 ppm Ti) are placed in a 1-liter flask equipped with a metal stirrer, an inlet for argon or nitrogen, and a short distillation column. The contents of the flask are placed under argon and lowered into a Woods' metal bath preheated to 300° C. After about 10 to 15 minutes, the ingredients are melted sufficiently to allow stirring. The contents are heated with stirring for an additional ½ hr. at 300° C. and a vacuum of 0.5 mm is applied gradually. After about ¾ hr. under full vacuum the reaction is stopped to give a high melt viscosity, clear, yellow polymer with an I.V. of 0.84 and a Tg of 119° C.

The polymer is injection-molded at 290° C. to give molded bars with a notched Izod impact strength of 10.7 ft-lb/in.

EXAMPLE 11

The example illustrates the preparation of a poly(ester-imide-amide) containing units from 70 mol % terephthalic acid, 68.5 mol % 1,4-cyclohexanedimethanol, 30 mol % trimellitic acid, and 31.5 mol % 4-(aminomethyl)cyclohexanemethanol.

A mixture of 104.6 g (0.630 mol) terephthalic acid, 99.8 g (0.693 mol) 1,4-cyclohexanedimethanol, 56.7 g (0.270 mol) trimellitic anhydride, 40.5 g (0.284 mol) 4-(aminomethyl)cyclohexanemethanol, and 0.15 g titanium tetraisopropoxide (100 ppm Ti) are placed in a 1-liter flask equipped with a metal stirrer, an inlet for argon or nitrogen, and a short distillation column. The contents of the flask are heated in a Woods' metal bath with stirring under argon at 220° C. for 1 hr., at 260° C. for 1 hr., and 280° C. for 1 hr., and at 300° C. for ¼ hr. A vacuum of 0.5 mm is gradually applied and maintained for about 1 hr. The flask is released to argon to give a high melt viscosity, light yellow, clear polymer with an I.V. of 0.79 and Tg of 116° C.

The polymer is injection-molded at 280° C. to give molded bars with a notched Izod impact strength of 4.4 ft-lb/in.

EXAMPLE 12

A polymer having the same composition as Example 11 is prepared to an I.V. of 0.51. The polymer is ground and solid-phase polymerized using the procedures of Example 7 to an I.V. of 1.02.

The polymer is injection-molded at 305° C. to give molded bars with a notched Izod impact strength of 20.2 ft-lb/in.

EXAMPLE 13

A poly(ester-imide-amide) containing units from 80 mol % terephthalic acid, 70 wt. % 1,4-cyclohexanedimethanol, 20 mol % trimellitic anhydride and 30 mol % 4-(aminomethyl)cyclohexanemethanol is prepared to an I.V. of 0.83 using the procedure of Example 11.

The polymer is injection-molded at 295° C. to give molded bars with a notched Izod impact strength of 22.0 ft-lb/in.

EXAMPLE 14

A poly(ester-imide-amide) containing units from 80 mol % terephthalic acid, 60 mol % 1,4-cyclohexanedimethanol, 20 mol % trimellitic anhydride, and 40 mol % 4-(aminomethyl)cyclohexanemethanol is prepared to an I.V. of 0.84 using the procedure of Example 11.

The polymer is injection-molded at 295° C. to give molded bars with a notched Izod impact strength of 15.0 ft-lb/in.

EXAMPLE 15

A poly(ester-imide-amide) containing units from 90 mol % terephthalic acid, 40 mol % 1,4-cyclohexanedimethanol, 10 mol % trimellitic anhydride, and 60 mol % 4-(aminomethyl)cyclohexanemethanol is prepared to an I.V. of 0.83 using the procedure of Example 11.

The polymer is injection-molded at 295° C. to give molded bars with a notched Izod impact strength of 2.3 ft-lb/in.

EXAMPLE 16

A poly(ester-imide-amide) containing units from 80 mol % terephthalic acid, 30 mol % 1,4-cyclohexanedimethanol, 20 mol % trimellitic anhydride, and 70 mol % 4-(aminomethyl)cyclohexanemethanol is prepared to an I.V. of 0.79 using the procedure of Example 11.

The polymer is injection-molded at 295° C. to give molded bars with a notched Izod impact strength of 2.2 ft-lb/in.

EXAMPLE 17

A polymer having the same composition as Example 1 is prepared in the melt using the preformed imide of trimellitic anhydride and 4-(aminomethyl(cyclohexanemethanol, 2,3-dihydro-2-[[4-(hydroxymethyl)cyclohexyl]methyl]-1,3-dioxo-1H-isoindole-5-carboxylic acid, to an I.V. of 0.76. The polymer has a Tg of 120° C.

The polymer is injection-molded at 290° C. to give molded bars with a notched Izod impact strength of 11.7 ft-lb/in.

EXAMPLE 18

A poly(ester-imide-amide) containing units from 98 mol % trimellitic anhydride, 2 mol % terephthalic acid and 100 mol % 4-(aminomethyl)cyclohexanemethanol is prepared according to the procedure of Example 1 except that the polycondensation is completed at 320° C. The polymer obtained has an I.V. of 0.87 and a Tg of 167° C.

The polymer is injection-molded at 305° C. to give molded bars with a notched Izod impact strength of 1.0 ft-lb/in.

EXAMPLE 19

The following example illustrates the preparation of the poly(ester-imide) containing units from 95 mol % terephthalic acid, 5 mol % trimellitic and 100 mol % 4-(aminomethyl)cyclohexanemethanol.

A mixture of 157.7 g (0.95 mol) terephthalic acid, 10.5 g (0.05 mol) trimellitic anhydride, 143.0 g (1.0 mol) 4-(aminomethyl)cyclohexanemethanol and 0.15 g titanium tetraisopropoxide is placed in a 1-liter flask equipped with a metal stirrer, an inlet for argon or nitrogen, and a short distillation column. The contents of the flask are heated in a Woods' metal bath with stirring under argon at 200° C. for ~20 minutes, and the temperature is raised to 260° C. for ~30 minutes. The temperature is then raised to 285°-290° C. and a vacuum of 0.5 mm is gradually applied. After ~30-45 minutes a high melt viscosity polymer with an I.V. of 0.5 is obtained. The polymer is ground to pass a 3 mm screen and then solid-phase polymerized at 240° C. for 6 hrs. to give a polymer with an I.V. of 1.0.

The polymer is injection molded at 310° C. to give molded bars with a notched Izod impact strength of 1.8 ft-lb/in.

The following examples illustrate the preparation of poly(ester-imides) based on aromatic acids other than terephthalic acid.

EXAMPLE 20

The polymer containing units from 80 mol % 2,6-naphthalenedicarboxylic acid, 20 mol % trimellitic acid, 79 mol % 1,4-cyclohexanedimethanol, and 21 mol % 4-(aminomethyl)cyclohexanemethanol is prepared as follows.

A mixture of 34.6 g (0.16 mol) 2,6-naphthalenedicarboxylic acid, 7.7 g (0.04 mol) trimellitic anhydride, 46.1 g (0.32 mol) 1,4-cyclohexanedimethanol, 6.0 g (0.042 mol) 4-(aminomethyl)cyclohexanemethanol, and 0.038 g titanium tetraisopropoxide is placed in a 100-ml flask equipped with a metal stirrer, an inlet for nitrogen and a short distillation column. The contents of the flask are heated in a Wood's metal bath with stirring under nitrogen at 220° for 1 hr., and then the temperature is raised to 260° C. for ½ hr., to 280° C. for ¾ hr. and then finally to 300° C. A vacuum of 0.5 mm is applied gradually. After ~20 minutes the reaction is stopped to give a clear, yellow, crystalline polymer with an I.V. of 0.67. A tough, clear, creasable film is pressed at 300° C.

EXAMPLE 21

The polymer containing units from 80 mol % 4,4'-sulfonyldibenzoic acid, 20 mol % trimellitic anhydride, 75 mol % 1,4-cyclohexanedimethanol, and 25 mol % 4-(aminomethyl)cyclohexanemethanol is prepared according to the procedures of Example 20. A high melt viscosity, clear, yellow polymer is obtained with an I.V. of 0.62. A tough, creasable film is pressed at 300° C.

EXAMPLE 22

The poly(ester-imide) containing units from 100 mol % trimellitic anhydride and 100 mol % 4-(aminomethyl)cyclohexanemethanol is prepared according to the procedure similar to Example 18. The polymer obtained has an I.V. of 0.81 and a Tg of 170° C.

The polymer is injection-molded at 305° C. to give molded bars with a notched Izod impact strength of 0.70 ft-lb/in.

The invention has been described in detail with particular reference to preferred embodiments thereof, but it will be understood that variations and modifications will be effected within the spirit and scope of the invention.

We claim:

1. Polymer composition comprising 5 to 98 mol % of repeating units from trimellitic acid or anhydride, 5 to 98 mol % of repeating units from 4-(aminomethyl)cyclohexanemethanol, 2 to 95 mol % of repeating units from aromatic dicarboxylic acids or esters thereof containing 8 to 16 carbon atoms and having at least three carbon atoms between carboxyl groups, and 2 to 95 mol % of repeating units from 1,4-cyclohexanedimethanol and wherein the mol % of the repeating units from trimellitic acid or anhydride does not exceed the mol % of repeating units from the 4-(aminomethyl)cyclohexanemethanol.

2. Polymer composition of claim 1 wherein the mol % of repeating units from the 4-(aminomethyl)cyclohexanemethanol is equal to or exceeds by up to 95 mol % the repeating units from the trimellitic acid or anhydride.

3. Polymer composition of claim 1 wherein up to 30 mol % of the repeating units from the 1,4-cyclohexanedimethanol are replaced with repeating units from at least one other aliphatic glycol containing 2 to 10 carbon atoms.

4. Polymer composition of claim 1 wherein at least 70 mol % of the repeating units from the 4-(aminomethyl)-cyclohexanemethanol are from trans-4-(aminomethyl)-cyclohexanemethanol.

* * * * *